(12) United States Patent
Konrad et al.

(10) Patent No.: US 9,045,291 B2
(45) Date of Patent: Jun. 2, 2015

(54) DEVICE AND METHOD FOR DISCHARGING PRODUCTS, PARTICULARLY PRODUCT CONTAINERS SUCH AS BOTTLES

(71) Applicant: KRONES AG, Neutraubling (DE)

(72) Inventors: Senn Konrad, Neutraubling (DE); Mareike Josefowitz, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/371,647

(22) PCT Filed: Dec. 28, 2012

(86) PCT No.: PCT/EP2012/077056
§ 371 (c)(1),
(2) Date: Jul. 10, 2014

(87) PCT Pub. No.: WO2013/110427
PCT Pub. Date: Aug. 1, 2013

(65) Prior Publication Data
US 2015/0027852 A1     Jan. 29, 2015

(30) Foreign Application Priority Data
Jan. 25, 2012   (DE) .......................... 10 2012 201059

(51) Int. Cl.
*B65G 47/84*     (2006.01)
*B65G 47/71*     (2006.01)
(Continued)

(52) U.S. Cl.
CPC .............. *B65G 47/845* (2013.01); *B65G 47/71* (2013.01); *B65G 47/841* (2013.01); *B65G 54/02* (2013.01); *B65G 47/34* (2013.01)

(58) Field of Classification Search
CPC .... B65G 47/845; B65G 47/841; B65G 47/34; B65G 47/71; B65G 54/02
USPC .......... 198/890, 370.02, 370.07, 370.08, 440, 198/441
See application file for complete search history.

(56) References Cited

U.S. PATENT DOCUMENTS 3,771,648 A * 11/1973 Revuelta ........................ 198/364
4,320,840 A *  3/1982 Braschos ....................... 209/523
(Continued)

FOREIGN PATENT DOCUMENTS

DE        3130308 C2   11/1984
DE       19525482 A1    1/1997
(Continued)

OTHER PUBLICATIONS

International Search Report for International Application No. PCT/EP2012/077056, dated Apr. 10, 2013.
(Continued)

*Primary Examiner* — Leslie A Nicholson, III
*Assistant Examiner* — Keith R Campbell
(74) *Attorney, Agent, or Firm* — Marshall, Gerstein & Borun LLP (57) ABSTRACT

A device and a corresponding method for discharging products, particularly product containers such as bottles from a transport path by means of one or more discharge segments, wherein the or each discharge segment comprises a carriage and a discharger, and the discharger can effect discharge of the product by a deflection. The or each discharge segment includes a second carriage, each of the two carriages mounted on a guide, and the discharger and the carriages are mechanically connected to one another such that the relative distance of the carriages from one another determines the deflection of the discharger.

15 Claims, 7 Drawing Sheets

(51) Int. Cl.
*B65G 54/02* (2006.01)
*B65G 47/34* (2006.01)

(56) References Cited

U.S. PATENT DOCUMENTS

| | | | |
|---|---|---|---|
| 5,988,356 A * | 11/1999 | Bonnet | 198/598 |
| 6,068,105 A | 5/2000 | Darwish et al. | |
| 6,575,691 B1 * | 6/2003 | Saeki | 414/744.5 |
| 6,722,836 B2 * | 4/2004 | Jager | 414/222.01 |
| 6,755,298 B1 * | 6/2004 | Heuft et al. | 198/370.07 |
| 6,889,485 B2 * | 5/2005 | Davaillon | 53/443 |
| 7,000,755 B2 * | 2/2006 | van Pinxteren et al. | 198/374 |
| 7,410,045 B2 * | 8/2008 | Patterson et al. | 198/370.07 |
| 7,997,401 B2 * | 8/2011 | Fischer | 198/411 |
| 2010/0140052 A1 * | 6/2010 | Martini | 198/419.2 |
| 2010/0276248 A1 * | 11/2010 | Gut | 198/370.02 |
| 2015/0001041 A1 * | 1/2015 | Barber et al. | 198/418.7 |

FOREIGN PATENT DOCUMENTS

| | | |
|---|---|---|
| DE | 19729657 A1 | 1/1999 |
| DE | 20002411 U1 | 6/2001 |
| DE | 69931057 T2 | 11/2006 |
| DE | 102009003847 A1 | 11/2010 |
| EP | 1020380 A1 | 7/2000 |
| EP | 1012087 B1 | 12/2002 |
| EP | 2057089 B1 | 1/2011 |

OTHER PUBLICATIONS

German Search Report for Application No. 10 2012 201 059.9, dated Jul. 4, 2012.

* cited by examiner

DEVICE AND METHOD FOR DISCHARGING PRODUCTS, PARTICULARLY PRODUCT CONTAINERS SUCH AS BOTTLES

CROSS-REFERENCE TO RELATED APPLICATION

The present application is the US national phase of International Patent Application No. PCT/EP2012/077056, filed Dec. 28, 2012, which application claims priority of German Application No. 102012201059.9, filed Jan. 25, 2012. The priority application, DE 102012201059.9, is hereby incorporated by reference.

FIELD OF THE DISCLOSURE

The present disclosure relates to a device for discharging products, particularly product containers such as bottles, from a transport path.

BACKGROUND

There are various discharge systems in the prior art.

For instance, patent DE3130308 C2 already discloses a device for discharging defective products from a conveyor belt. In this device, the discharging operation is carried out by discharge elements that are driven by a linear motor. The discharge elements are arranged on a guide track leading to the conveyor belt and can be collected in the manner of a magazine. For the discharge of a defective product one of the discharge elements is guided on the guide track towards the product which is then pushed by the element by way of physical contact onto a transportation belt extending in parallel with the conveyor belt. The individual discharge elements are rigid; the pushing onto the transportation belt is just accomplished through the inclined position of the guide track.

The device has the advantage that the discharge segments are individually controlled and can effect the discharge. It is however not possible with said device to perform discharges onto a plurality of transportation belts. Moreover, it is also difficult to integrate the device into different processes due to the necessary inclined position relative to the transportation belt because the speed of the products and the length of the discharge path determine the necessary discharge speed and thus the inclined position of the device for the discharge.

EP1012087 B1 describes a device in which one or plural discharge segments which are movable in a direction perpendicular to the direction of movement of the transporter are guided in a carriage in transportation direction. When the carriage is moved in the transportation direction with the same speed as the products to be discharged, these can be discharged by way of the extensible discharge segments onto different discharge belts.

Due to the movable discharge segments this device makes it possible to carry out a discharge also onto several discharge belts. Furthermore, in this device the extension speed of the discharge segments and the speed of the carriage can be adapted. However, there is a latency time between different discharge operations for the device because the carriage must first be moved back into the initial position. To minimize this latency time, one possibly needs correspondingly high discharge speeds in a direction perpendicular to the movement direction of the products on the transporter, which poses problems especially in the case of lightweight or fragile products. It also turns out to be a drawback that even with only one defective discharge segment the complete device is subjected to a standstill time for the necessary repairs.

It would be desirable to have, a device for discharging products, particularly product containers such as bottles, from a transport path, which device can be used at high operating speeds and allows a flexible discharge as well as high reliability and also short standstill times in case of repair.

SUMMARY OF THE DISCLOSURE

The device of the present disclosure is distinguished by a very high flexibility due to the use of one or plural discharge segments which comprise a discharger and two carriages. These discharge segments, which are positioned on a guide, actively effect, by varying the relative position of the carriages relative to one another, the discharge of the products intended for this from the transport path onto one or plural discharge paths. It is therefore not required that the device should be arranged at a specific angle relative to the transport path, and undesired latency times caused by the retraction of the discharge segments into their initial position do also not occur.

In one embodiment, the carriage is driven with the help of a linear motor. The guide forms the stator and each of the carriages acts as a rotor. This yields a very accurate and flexible control of each carriage, and the relative position of the two carriages of a discharge segment relative to one another can be adjusted in an efficient manner. Furthermore, one achieves less wear of the carriages and of the guide due to the use of a linear motor and the resulting reduced contact area of carriages and guide.

In a further embodiment, the discharge segments and the associated dischargers, respectively, can be moved independently of one another at the same speed as the products to be discharged. This reduces possible accelerations of the products to be discharged in transportation direction, thereby permitting a closer side-by-side arrangement of products in the transport path.

In one embodiment, the two carriages are moved on different guides, which may e.g. be arranged in parallel in the area along the transport path. This reduces the space needed for a discharge segment and permits the discharge of two products positioned directly side by side on the transport path without any major difficulties.

In one embodiment, the two carriages of one discharge segment or of the discharge segments are moved on one and the same guide. This reduces the control efforts for the carriages in comparison with the use of a respective guide for each of the two carriages.

In further embodiments, the mechanical connection between the discharger and the carriages can be ensured by rigid connections with hinges or a scissor lever or by non-rigid connections, whereby the device can be adapted to different products to be discharged or to various spatial conditions.

In a further embodiment, the mechanical connection between the discharger and the carriages is such that upon change in the relative position of the carriages relative to one another a movement of the discharger takes place in a direction perpendicular to the direction of movement of the products in the transport path either only in relation to one of the two carriages or in relation to the center of the connection path of the two carriages. This permits an exact control of the discharge operation.

In one embodiment, the guide forms a closed curve which can be subdivided into a discharge path, a return path and a rest position, and optionally also further paths or positions, such as e.g. an acceleration path. This permits the independent discharge of plural products upon use of plural discharge segments and simultaneously reduces or avoids the latency time between one discharge process and the next one.

In one embodiment a proximity switch and a control device control the use of one or plural discharge segments. This permits the efficient automated use of only so many discharge segments as are needed for the discharge of the corresponding number of products and thereby reduces the operation costs and wear.

For instance when the device is used, a method can be implemented for discharging products, particularly product containers such as bottles, from a transport path with the help of one or plural discharge segments, wherein the or each discharge segment comprises a carriage and a discharger, and the discharger can perform the discharge of the product by way of a deflection. The method is distinguished in that the deflection of the discharger can be effected by means of a mechanical connection by changing the relative position of the second carriage in relation to the first carriage. This permits a very accurate discharge which is individual for each product, from the transport path onto a discharge path.

In one embodiment, the method is characterized in that it can selectively be implemented with one or more of the following features: the discharge segments are independent of one another; the discharge segments are driven by one, two, but at any rate joint, linear motors; a product is discharged from the transport path by the use of only one discharge segment; the discharge of the products from the transport path can be carried out on different discharge paths; the provision of a discharge segment for the discharge of a product from the transport path is effected by way of a proximity switch; the control of the discharge segment(s) is effected by a control device. These features while being suitably combined make the method highly flexible in relation to the adaption to the products to be discharged and in relation to the industrial process into which the method is to be integrated. For instance, an adaptation of the method to different product distances or speeds of the products on the transport path can be realized without any great difficulties. Furthermore, these features reduce the method's susceptibility to failure.

In a further embodiment, it is possible through a suitable selection of the speed profile of the carriages to discharge the products from the transport path with a very low momentum transfer to one of the discharge paths, or to sort them out with a very high momentum transfer from the transport path into containers provided for this purpose. To this end the relative speed of the carriages with respect to one another is changed slowly in the first case in comparison with the second case; in the second case it is changed swiftly. The first one of the two options permits a discharge of the products to be discharged with a permanent physical contact of discharger and product to be discharged during the discharging operation, whereby tipping over can be prevented. The second variant permits a fast discharge of products in the case of which tipping over is very likely due to specific characteristics of the product to be discharged, which characteristics have an influence on the stability of the products, with a non-permanent and thus shorter physical contact of discharger and product to be discharged, into containers provided for this purpose. These containers may e.g. be containers for green or white glass or, in connection with substance detection systems, containers for separation and disposal of different flavoring agents or odorous substances.

In a further embodiment, there is an additional path section on which additional carriages are supported that can be used in case of need upon discharge of a product in addition to the two carriages of a discharge segment. The additional carriages can here get into contact with the carriages of the discharge segment and either further accelerate or decelerate these carriages. Hence, the force which upon discharge of the product to be discharged is created due to the change in the relative position of the more than two carriages relative to one another can be increased, and it is possible to discharge even products with a greater mass than other products in the transport path, for which a discharge with the help of two carriages is therefore not enough.

DETAILED DESCRIPTION

The discharge of products, particularly product containers such as bottles, is accomplished by means of a discharging device having one or plural discharge segments.

Figure 1:
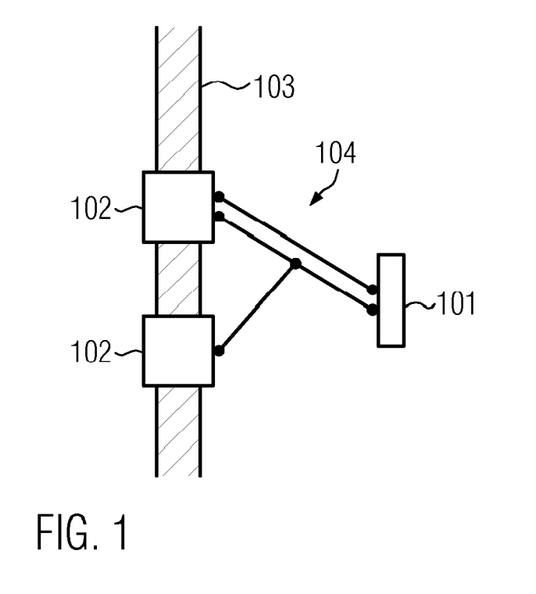
FIG. 1 is a schematic illustration of a discharge segment on a guide.

FIG. 1 schematically illustrates a discharge segment 104 on the corresponding guide 103. The connection of discharge segment 104 and guide 103 is established by means of two carriages 102 that have a connection with the guide 103. In addition to said carriages 102, the discharge segment 104 comprises a discharger 101 which can accomplish the discharge of a product by way of physical contact. With a change in the relative distance of the carriages 102 from one another, the product to be discharged can be discharged by changing the deflection of the discharger 101. The change in the relative position of the carriages 102 on the guide 103 can be effected by changing the respective carriage speeds. Here, the speed of one or both carriages 102 is changed for a limited time, so that the resulting speed difference between the two carriages over a certain period of time leads to a decrease or increase in the relative distance of the carriages in the direction of the guide.

Figure 2:
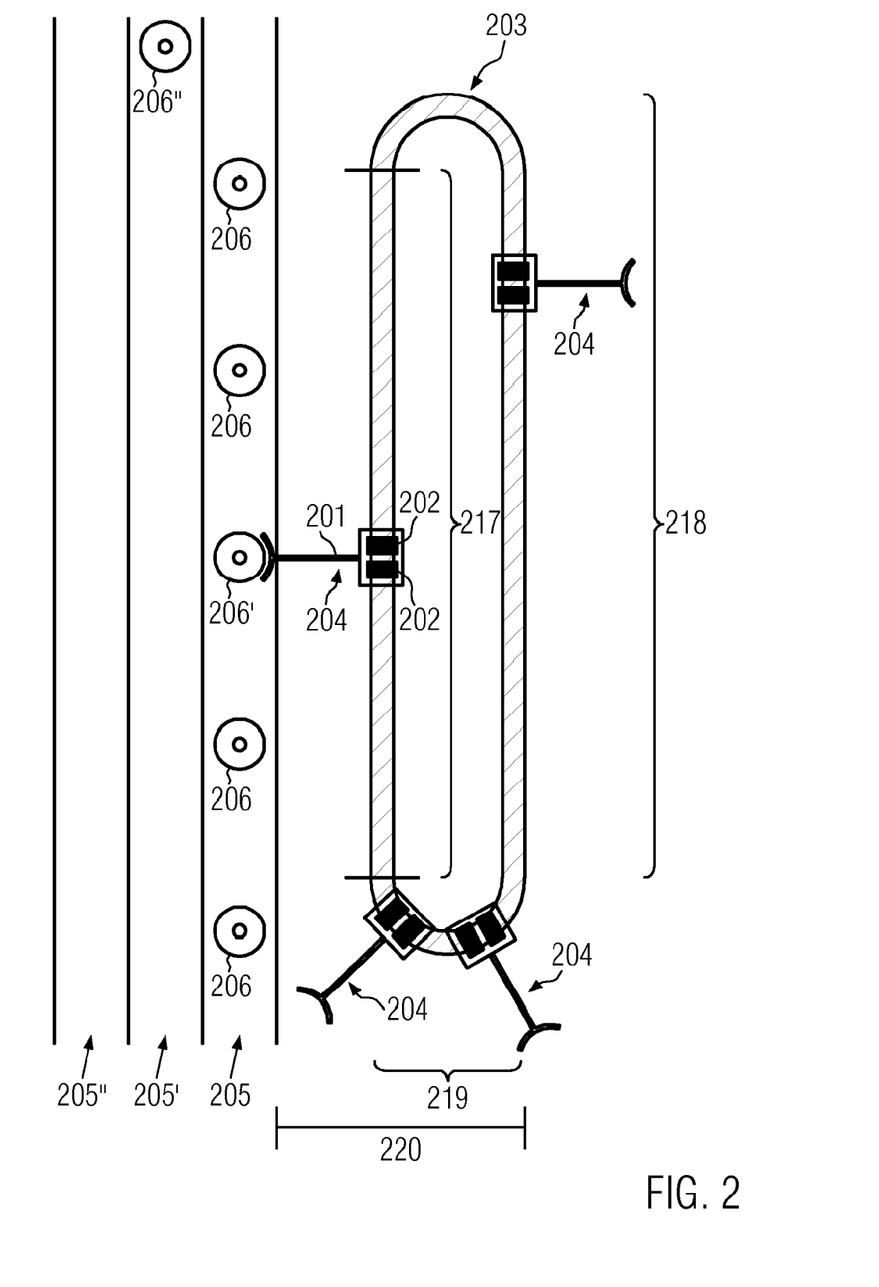
FIG. 2 is a schematic top view of the device of the present disclosure with transport belts.

FIG. 2 shows a possible embodiment of the discharging device 220. As shown, it is mounted next to the corresponding transport path 205 and the adjoining discharge paths 205' and 205". The discharging device 220 comprises a guide 203. This guide can be subdivided into the sections "discharge path" 217, "return path" 218 and "rest position" 219. A possible incorporation of additional path sections, for instance of a repair station for defective discharge segments or another waiting position at which discharge segments for special uses are located, such as for instance, but not restricted thereto, the discharge of products from the transport path with special characteristics, or segments specifically conceived for the cleaning of the transport path 205 or the discharge paths 205' and 205" or additional carriages 202, is conceivable.

The discharge segments 204 can be driven on the whole guide 203. A possible embodiment is the use of a linear motor which is formed by a corresponding guide 203 as the stator, consisting in this embodiment of magnets, and the carriages 202 which then serve as rotors. Other drives, such as for instance by way of Bowden cables or the like, are possible. On the discharge path 217, the deflection of the discharger 201 is adjusted by changing the distance of the carriages 202 in the discharge segment 204. If there is an element 206' among the products 206 that has to be discharged, a physical contact is established by way of the deflection between the product 206' to be discharged and the discharger 201. Along the discharge path 217 the amplitude of the deflection is then changed by adjusting the distance of the carriages 202 from one another. The product 206' to be discharged is thereby passed from the transport path 205 to one of the discharge paths 205' or 205". The product 206" which is then discharged is further conveyed on the discharge path 205' in FIG. 2 and the physical contact between discharger 201 and discharged product 206" is terminated in that the relative distance of the carriages 202 from one another is for instance set to the initial value. Subsequently, the discharge segment 205 is guided on the return path 218, in a direction opposite to the direction of movement of the products 206 on the transport path 205, into the rest position 219. In this rest position 219 the one or plural discharge segments 204 can then be stored until the next discharge is required.

Figure 3:
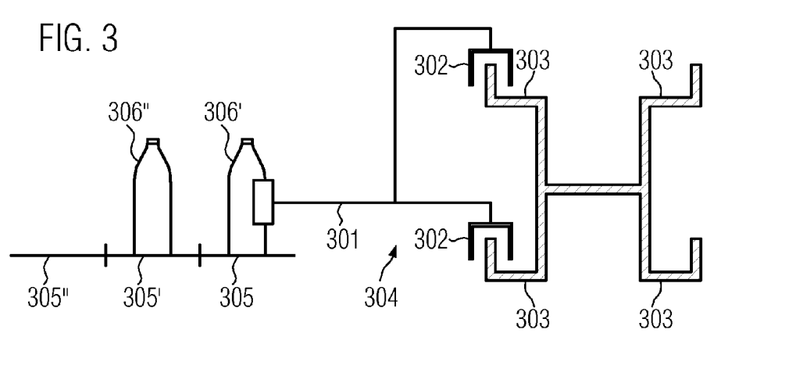
FIG. 3 is a detailed schematic side view of a discharge segment with guide and transport path.

FIG. 3 shows with a possible arrangement of two guides 303 how the two carriages 302 of a discharge segment 304 can be mounted. In this embodiment, the two guides are arranged such that the areas respectively enclosed by the guides are in parallel with one another. If these areas represent planes, these are plane-parallel. One of the carriages 302 is positioned on the upper guide 303; the other carriage 302 on the lower guide 303. The carriages are connected via suitable connections to the discharger 201 which carries out the discharge of products 306' to be discharged from the transport path 305 to a discharge path 305'. In this embodiment, the change in the relative position of the carriages 302 with respect to one another is not effected by way of a different form of the two guides 303, but by changing the speed profile of the carriages along the guides.

Figure 4:
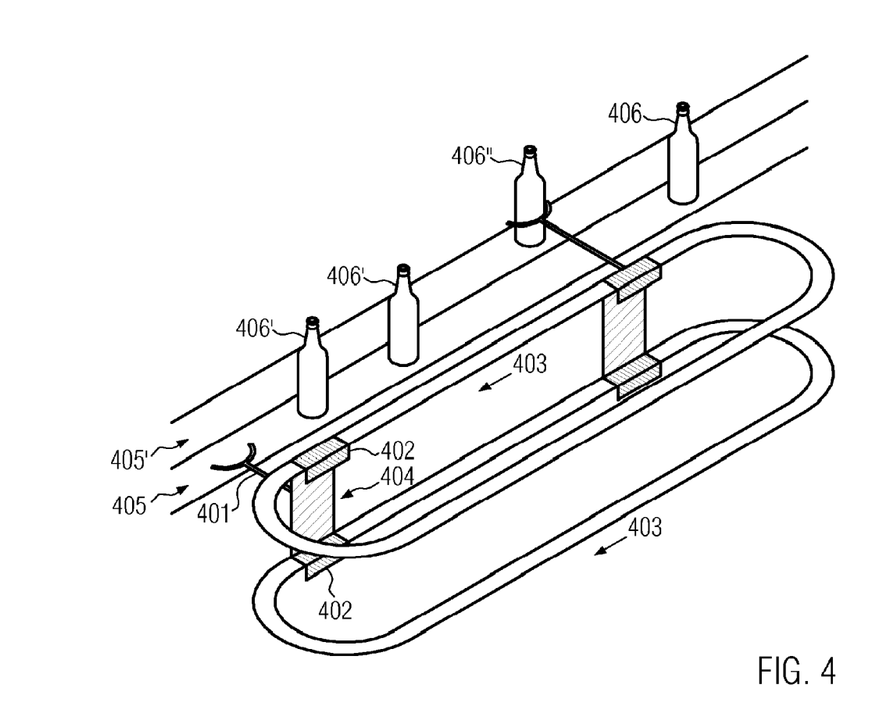
FIG. 4 is a schematic isometric view of the device of the present disclosure.

FIG. 4 shows a schematic three-dimensional view of the device and a transport path 405 and a discharge path 405'. In this embodiment the carriages 402 may be positioned within the discharge segment 404. The deflection of the discharger 401 can then be changed by varying their relative position relative to one another, and a product 406' to be discharged can thus be discharged. A possible embodiment of the drive of the discharge segments 404 can be implemented through the use of linear motors, formed by the carriages 402 and the guides 403 extending in parallel.

Figure 5A:
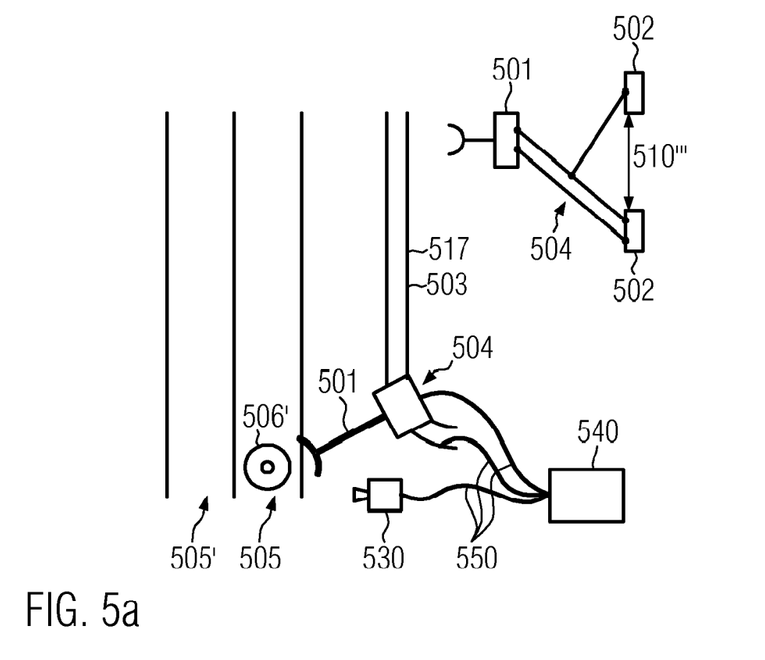
FIG. 5a is schematic illustration of a first step in a discharge operation of the present disclosure.
Figure 5B:
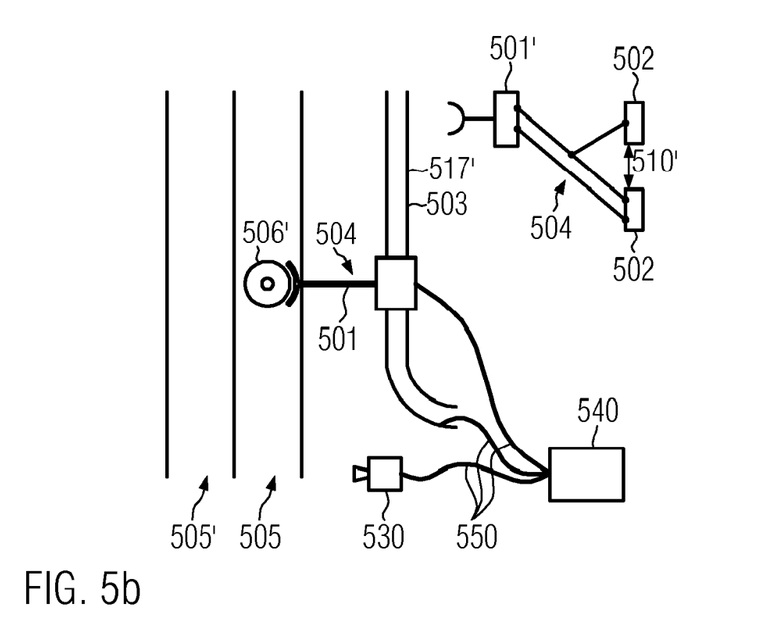
FIG. 5b is a schematic illustration of a second step in a discharge operation.
Figure 5C:
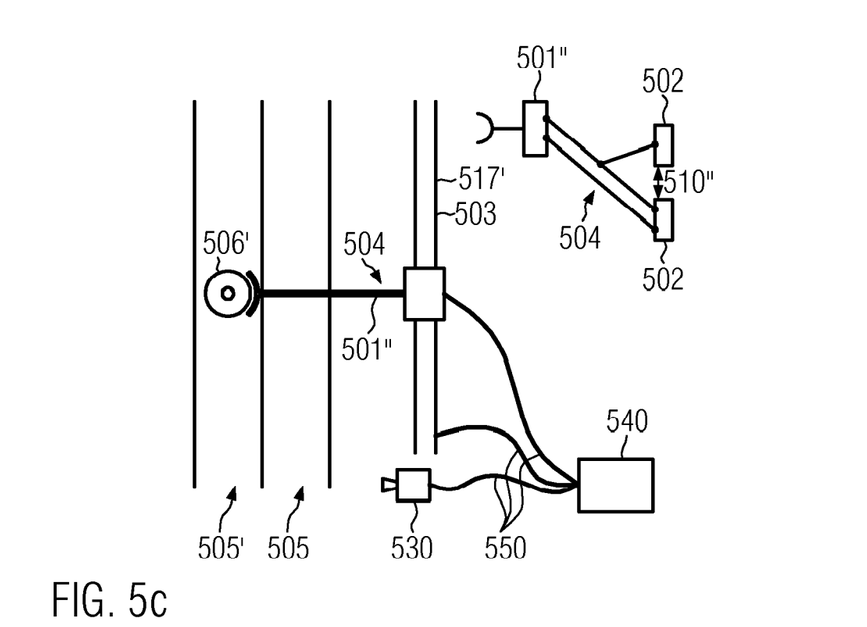
FIG. 5c is a schematic illustration of a third step in a discharge operation.
Figure 5D:
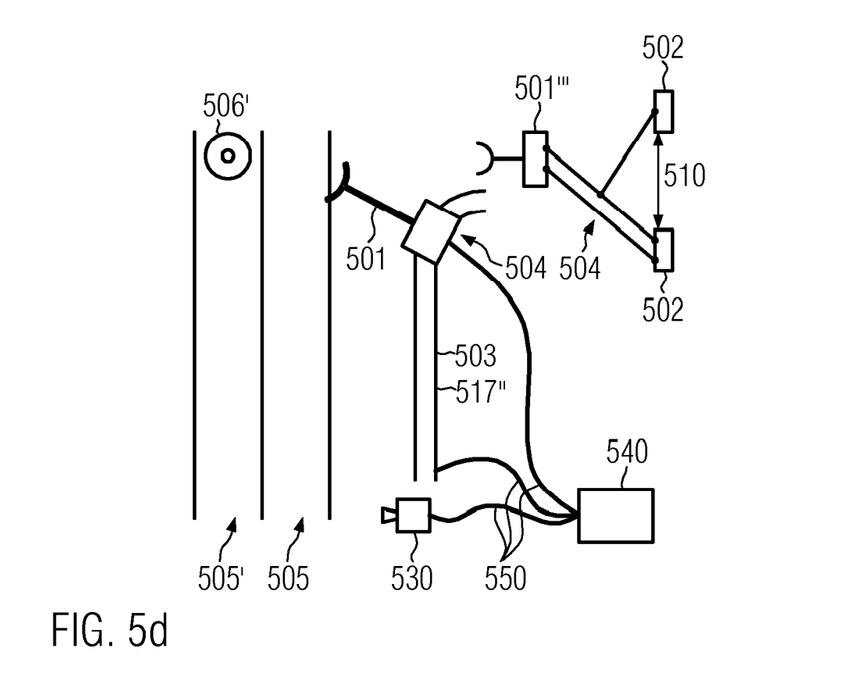
FIG. 5d is a schematic illustration of a fourth step in a discharge operation.

The change in the relative position of the carriages is shown in FIGS. 5a to 5d. In this embodiment, both carriages 502 move on the same guide 503. This is just a possible embodiment and only serves the purpose of better illustration. The process described hereinafter can also be implemented by using two guides. At the beginning of the discharge path 517 (FIG. 5a) on the guide 503 the two carriages have a distance 510. If a product 506' is to be discharged from the transport path 505 onto a discharge path 505', a discharge segment 504 is activated, for instance by the proximity switch 530 via a control device 540, and its movement, described hereinafter, on the guide 503 is controlled by the control device 540. The connection between proximity switch 530, control device 540 and guide 503 and also the carriages 502 in the discharge segment 504 can be established via wireless connections or cables. On the discharge path 517' (FIG. 5b), the distance 510 of the carriages 502 is changed to the distance 510' by adjusting the speed of the carriages 502 by way of the control device 540. At the corresponding value of the discharge the discharger 501' gets into physical contact with the product 506' to be discharged. The whole discharge segment 504 and the product 506' to be discharged are now moving with the same speed component in transportation direction. When the distance of the carriages 502 is further changed from 510' to 510" (FIG. 5c), the product 506' to be discharged is discharged onto a discharge path 505'. The discharge of the product 506' to be discharged can be carried out, controlled by the control device 540, in such a manner that, depending on the container diameter of the product 506' to be discharged, the discharging operation is always carried out centrically with respect to a discharge path 505' with the necessary force depending on the mass of the product 506' to be discharged. For changing the distance of the carriages 502 from one another the speed of the carriages 502 is varied in the movement direction of the products of the transport path. The speed of the discharge segment 504 and of the discharger 501, respectively, in the movement direction of the products on the transport path 505 remains however equal to the speed of the product to be discharged in the transport path. When the discharge has been completed at the end of the discharge path 517", the distance of the carriages is set from 510" to the initial value 510 again (FIG. 5d). As a result, the deflection of the discharger 501" is also set to the initial value. The discharge segment 504 can then return, as shown in FIG. 2, via the return path 218 into the rest position 219 and is available for the next discharge.

Figure 6A:
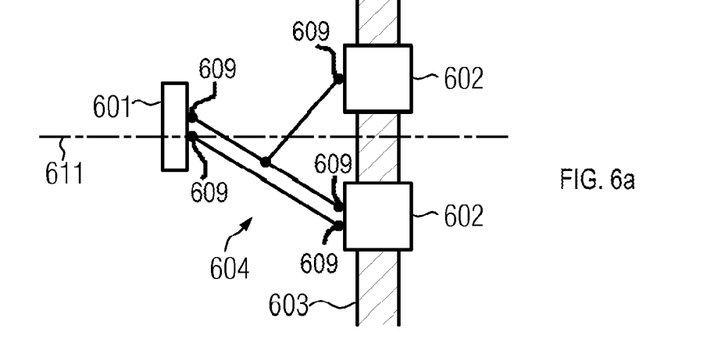
FIG. 6a is a top, semi-schematic view of a first type of connection between the carriage and discharger.

FIGS. 6a, 6b, and 6c shows some possible embodiments for the mechanical connection of the carriages 602 to the discharger 601. For instance, as illustrated FIG. 6a the discharger 610 can be connected to the two carriages 620 via rigid connection rods with hinges 609. Here, it is prevented via the connection of the discharger 601 to one of the carriages 602 via two connection rods with hinges that an uncontrolled movement of the discharger 601 can take place. The connection of one of the connection rods via a further connection rod provided with hinges to the second carriage 602 implements the change in the deflection at a varying distance of the carriages 602 from one another. In a special form of implementation, in which all connection rods have the same length and a respective connection rod of each carriage 602 is fastened to the center of the discharger and to the center of the respective carriage via a hinge, the position of the discharger relative to the center 611 of the connection line of the two carriages 602 remains always the same.

Figure 6B:
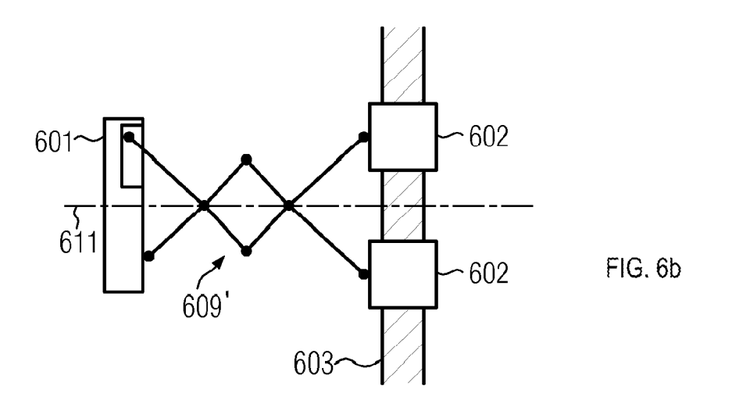
FIG. 6b is a top, semi-schematic view of a second type of connection between the carriage and discharger.

A further possible implementation of the mechanical connection of the carriages 602 with the discharger 601 can be achieved by means of a scissor lever 609' as illustrated in FIG. 6b. This lever is fastened via hinges to the carriages 602. On the discharger 601, the scissor lever is mounted at one place with a hinge and is movably mounted at the other place, e.g. in a recess, a lever end guide or a rail, so that the scissor lever 609' as such can be flexibly changed in its length, depending on the relative position of the carriages 602 from one another. In this case, too, the position of the discharger relative to the center 611 of the carriages remains constant.

Figure 6C:
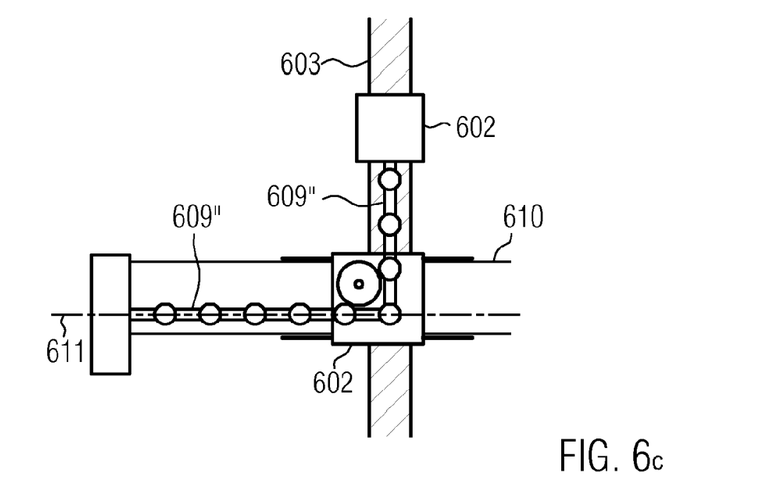
FIG. 6c is a top, semi-schematic view of a third type of connection between the carriage and discharger.

As illustrated in FIG. 6c, a further possible form of implementation of the mechanical connection of the carriages 602 with the discharger 601 can be achieved by means of non-rigid connection elements. A possible embodiment is a flexible chain 609", e.g. a push chain in a chain guide, so that the transmission of pulling and pushing forces is possible. This chain 609" is fastened from one of the carriages 602 via a deflection wheel in the other carriage 602 to the discharger 601. If the discharger is fastened via a rail 610, which is movable in a direction perpendicular to the movement direction of the products to be discharged on the transport path, to the last-mentioned carriage 602, the change in the distance of the carriages from one another can be directly translated via the chain 609" into a change in the deflection of the discharger 601. Here, the position of the discharger remains constant relative to an arbitrarily chosen axis 611, which is moved along with the rail 610.

Figure 7A:
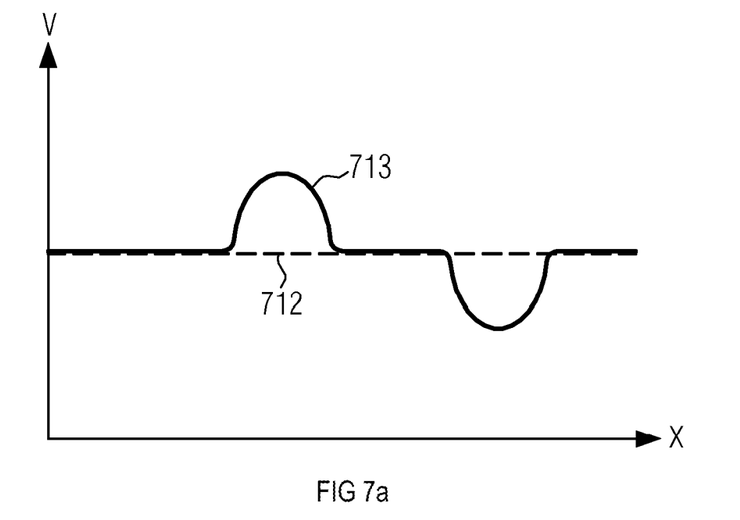
FIG. 7a is a plot of a first speed profile of the two carriages of a discharge segment.
Figure 7B:
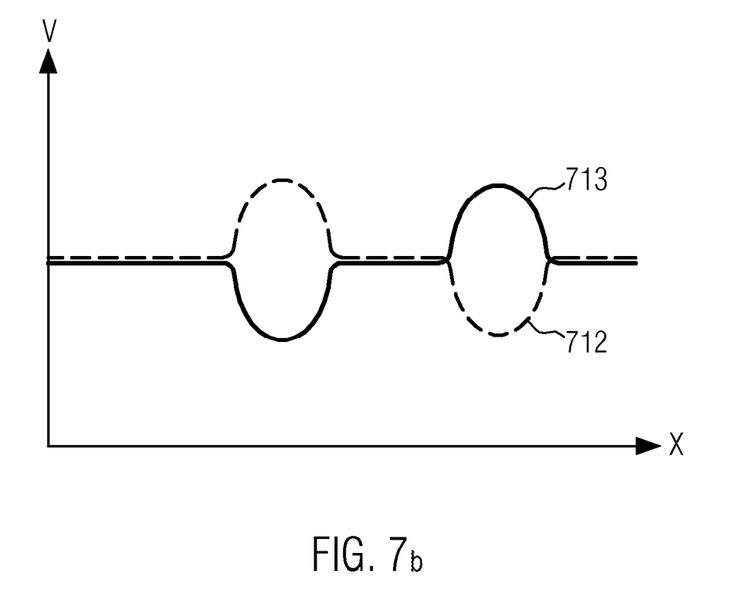
FIG. 7b is a plot of a second speed profile of the two carriages of a discharge segment.

FIG. 7 and FIG. 7b illustrate two possible speed profiles of the carriages 602. Shown is only the speed profile depending on the place x of the carriages 502 on the discharge path, as is for instance shown in FIG. 2. In the first embodiment, which can e.g. be implemented in an embodiment of the mechanical connection by non-rigid connection elements, one of the carriages moves at the constant speed 712. The position of the discharger remains constant with respect to said carriage, or a chosen point moved along with said carriage, in the movement direction of the products in the transport path. The second carriage is subjected at a specific place x' to an acceleration so that its speed 713 is raised. The distance 510 of the carriages 502 from one another is thereby first changed to the distance 510', and the discharger 501 can carry out the discharge of the product 506' to be discharged. When the desired deflection of the discharger 501 is achieved, the speed 713 is also reduced to the speed 712 to maintain the distance 510" and thus the adjusted deflection. When the discharge operation is completed, the change in the distance 510" of the carriages 502 is reversed in that the speed 713 is reduced. When the original distance 510 has been reached, the speeds 712 and 713 are also identical, so that the distance of the carriages 602 from one another does no longer change.

In a further embodiment both carriages 502 are subjected to a change in speed at a specific place so that one of the carriages with the speed 713' is delayed and the other one with the speed 712' is accelerated. This speed profile could be implemented in the use of rigid connection elements; the position of the discharger 501 relative to the center of the connection path of the two carriages 502 does here not change in the movement direction of the products in the transport path. As soon as the necessary deflection for the discharge of a product 506' out of a transport path 505 onto a discharge path 505' has been achieved, the speeds 712' and 713' of the two carriages 502 are again the same. After the discharge has been completed, the distance of the carriages relative to one another is again set to the initial value by acceleration of the carriage 502 with the speed 713' and by deceleration of the carriage 502 with the speed 712'. Thus, the discharge operation is completed and the discharge segment 504 can return via the return path into the rest position.

The illustration of the speed profiles in FIG. 7a and FIG. 7b only show the basic changes in the speed components of the carriages 502 in transportation direction and certainly do not serve in this form as a restriction. For instance, a product 406' can be discharged at any desired position of the discharge path 217 different from position x, which has been used in FIG. 7, and for any desired period of the discharge operation.

What is claimed is:

1. A device for discharging products, from a transport path by means of one or more discharge segments, wherein the or each discharge segment comprises a carriage and a discharger, and said discharger can effect a discharge of the product by way of a deflection, the or each discharge segment comprising a second carriage, wherein each of the two carriages is mounted on a guide to be movably supported and the discharger and the carriages are mechanically connected to one another such that the relative distance of the carriages from one another determines the deflection of the discharger, wherein the guide has a closed geometry.

2. The device according to claim 1, the carriages and the guide forming a linear motor.

3. The device according to claim 1, and a plurality of discharge segments are provided that are movable independently of one another.

4. The device according to claim 1, and the two carriages of the or each discharge segment are mounted on one and the same guide or on different guides.

5. The device according to claim 1, the or each discharge segment having a mechanical connection of the discharger and of the two carriages such that at least one rigid connection rod is respectively connected via hinges to both the discharger and a respective one of the two carriages.

6. The device according to claim 1, the or each discharge segment having a mechanical connection of the discharger and of the carriages via a scissor arm.

7. The device according to claim 1, the or each discharge segment having a mechanical connection of the discharger and of the two carriages such that the discharger and the two carriages are connected by non-rigid connection elements, for instance by a chain, which translate the changes in the relative position of the two carriages relative to one another into a change in the deflection of the discharger.

8. The device according to claim 1, the or each discharge segment having a mechanical connection of the discharger and of the two carriages such that:
a movement of the discharger relative to one of the two carriages takes place only in a direction perpendicular to the movement direction of the products of the transport path,
or a movement of the discharger relative to the center of the two carriages takes place only in a direction perpendicular to the movement direction of the products of the transport path.

9. The device according to claim 1, the guide comprising:
a discharge path which is arranged along the movement direction of the products in the transport path and on which at any place the product to be discharged can be discharged by the discharge segment;
a return path on which the carriages are decelerated and on which the movement of the carriages can be opposite to the movement direction of the products in the transport path; and
a rest position at which discharge segments can be arranged one after the other.

10. The device according to claim 1, and a proximity switch that commands provision of a discharge segment; and
a control device that determines the acceleration and speed of the carriages on the discharge path from the speed of the product to be discharged in the transport path.

11. The device according to claim 1, the one or plural discharge segments are: able to move on the discharge path at the same speed as the products in the transport path.

12. The device according to claim 1, the products to be discharged being product containers.

13. The device to according to claim 12, the product containers being bottles.

14. A method for discharging products from a transport path by means of one or plural discharge segments, wherein the or each discharge segment comprises a carriage and a discharger, and the discharger can effect the discharge of the product by a deflection comprising effecting the deflection of the discharger by way of a mechanical connection by changing the relative position of a second carriage with respect to the first carriage, wherein the first and second carriages are moved along a guide having a closed geometry.

15. The method according to claim 14, including one or more of the following:
- effecting the discharge by discharge segments which are movable independently of one another;
- driving the discharge segments by linear motors;
- effecting the discharge of a respective product by exactly one discharge segment;
- carrying out the discharge from the transport path onto one or plural discharge paths;
- effecting the provision of one or plural discharge segments by a proximity switch; and
- effecting the control of the discharge segment(s) by a control device.

\* \* \* \* \*